United States Patent
Gruenfelder et al.

(10) Patent No.: US 7,594,426 B1
(45) Date of Patent: Sep. 29, 2009

(54) M45 PROTECTIVE MASK OUTLET VALVE ADAPTER

(75) Inventors: Nicole L. Gruenfelder, Baltimore, MD (US); Chika N. Nzelibe, Baltimore, MD (US); Joshua D. Israel, Baltimore, MD (US); Lowry J. Brooks, Jr., Fallston, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 303 days.

(21) Appl. No.: 11/696,371

(22) Filed: Apr. 4, 2007

(51) Int. Cl.
*G01M 3/08* (2006.01)
*G01M 3/04* (2006.01)

(52) U.S. Cl. .............................................. 73/46; 73/40

(58) Field of Classification Search ..................... 73/40, 73/46
See application file for complete search history.

(56) References Cited

U.S. PATENT DOCUMENTS

| 4,832,011 | A | * | 5/1989 | Busch | 128/202.13 |
| 4,914,957 | A | * | 4/1990 | Dougherty | 73/40 |
| 2005/0223778 | A1 | * | 10/2005 | Tilley | 73/40 |
| 2007/0125164 | A1 | * | 6/2007 | Zielinski et al. | 73/167 |

* cited by examiner

*Primary Examiner*—Hezron Williams
*Assistant Examiner*—Nathaniel Kolb
(74) *Attorney, Agent, or Firm*—Ulysses John Biffoni

(57) ABSTRACT

An adapter to connect a portable testing device known as the Joint Service Mask Leakage Tester (JSMLT) to the outlet valve body of a protective mask such as the M45 mask for testing and validating the operation of the outlet valve of the mask prior to use.

15 Claims, 5 Drawing Sheets

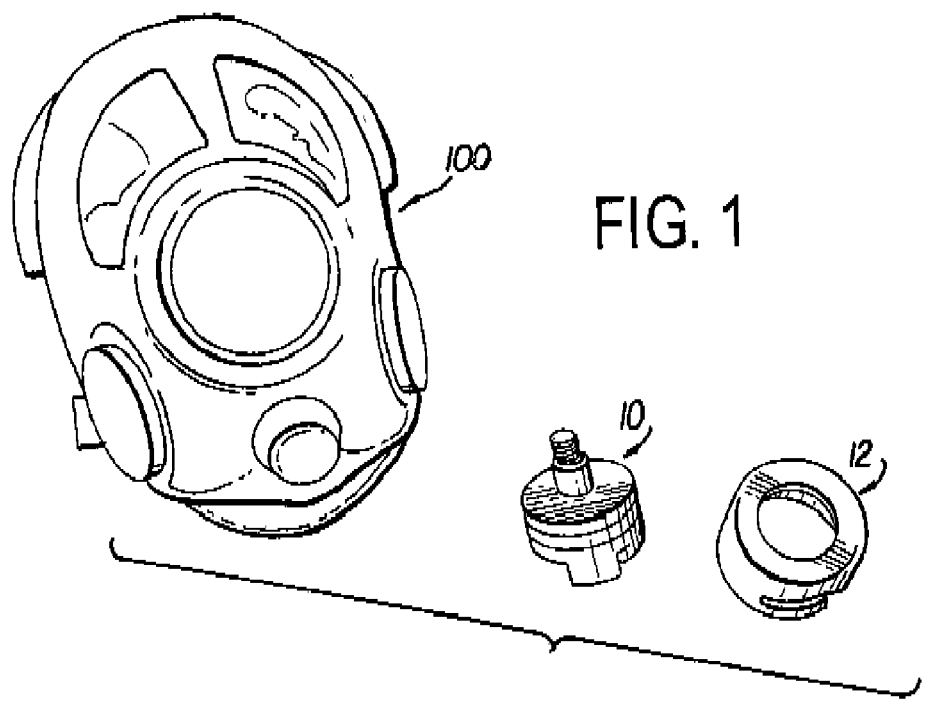
FIG. 1
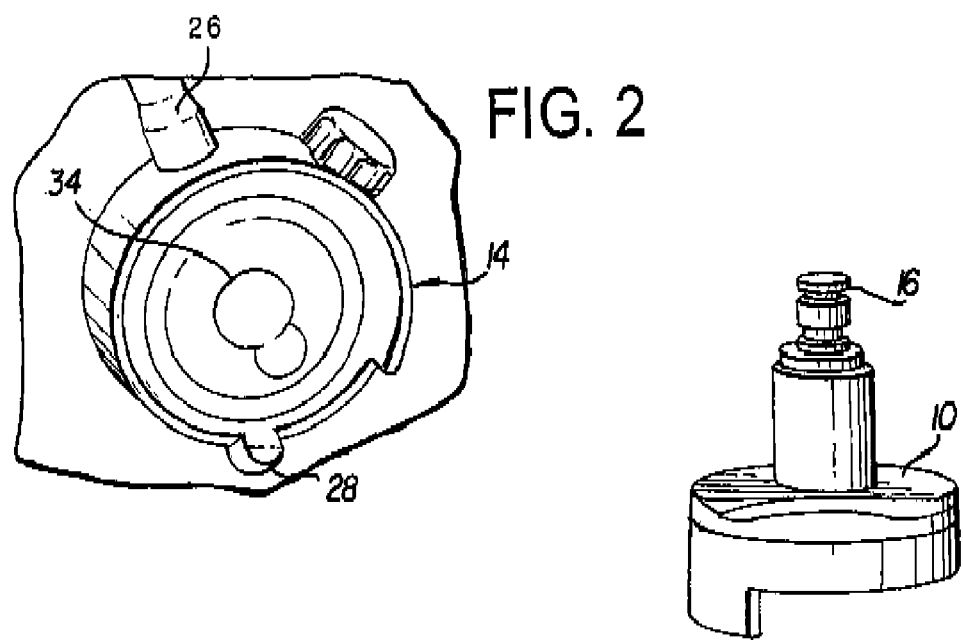
FIG. 2
FIG. 3(a)
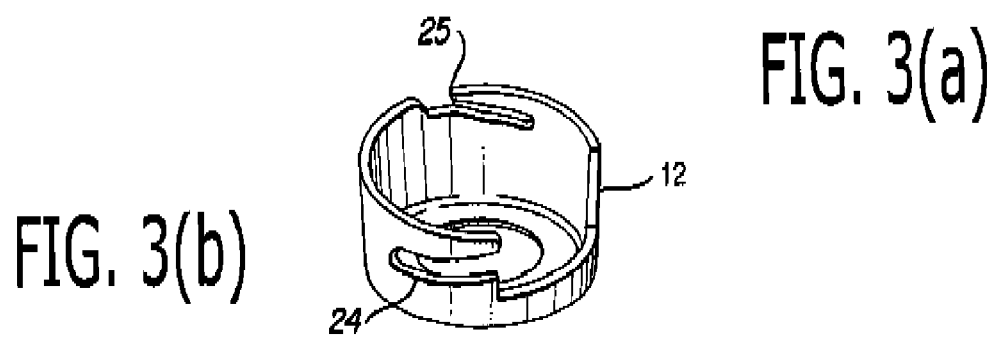
FIG. 3(b)

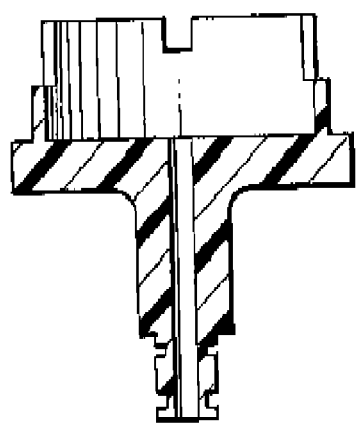
FIG. 9(a)
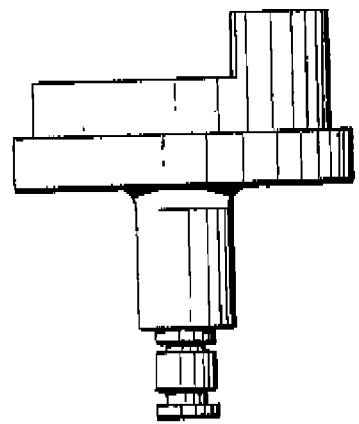
FIG. 9(b)
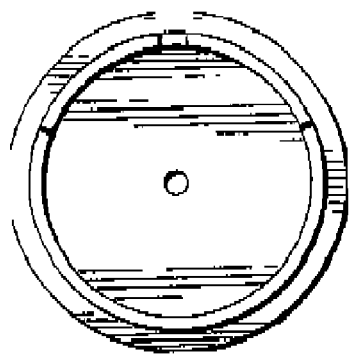
FIG. 9(c)
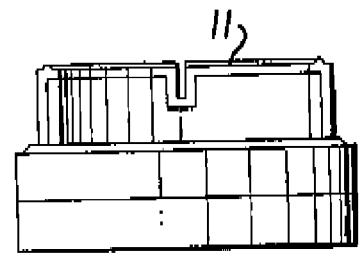
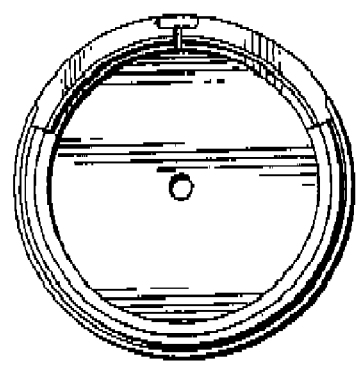
FIG. 10(a)
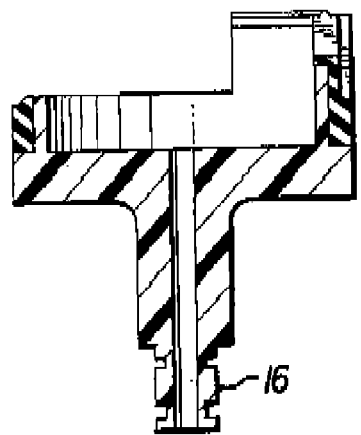
FIG. 10(b)
FIG. 10(c)

M45 PROTECTIVE MASK OUTLET VALVE ADAPTER

GOVERNMENT INTEREST

The invention described herein may be manufactured, licensed, and used by or for the United States Government.

BACKGROUND OF THE INVENTION

1. Field of the Invention

Protective masks, also known as gas masks, chemical-biological masks, or more recently as joint service masks, prevent the wearer from exposure of portions of the face, especially the mucus linings of the mouth and respiratory system and the eyes, from contact with irritating and potentially debilitating or fatal environments. Such masks include outlet valves to permit the wearer to exhale while wearing the mask, but also provide a possible site for leaks. Up until now, there was no reliable way to test the outlet valves (OV) on the M45 mask prior to actual use. This invention provides an OV leakage test adapter for the M45 mask.

2. Description of the Related Art

Generally, protective masks, or gas masks, are known to employ outlet valves to allow the wearer to exhale while maintaining a seal against exposure of the wearer to poisonous or noxious gases since about World War I.

However, increased hazards in the environment which not only include noxious or poisonous gases, but have come to include other chemical, biological, radiological or nuclear agents, have required much more sophisticated masks. Accordingly, the art has developed what has come to be known as the state of the art Joint Service Mask (M45). In a preferred embodiment, the present invention is directed to a leakage tester useful specifically for the M45 mask OV.

SUMMARY OF THE INVENTION

The Joint Service Mask Leakage Tester (JSMLT) is a portable testing device capable of testing serviceability and proper fit of current and future chemical, biological, radiological and nuclear (CBRN) protective masks.

In order to test the OV of the M45, the present inventors developed an outlet valve adapter (OVA) to be used with the JSMLT.

The outlet valve adapter (OVA) will be explained in detail as an embodiment of the invention for an M45 mask which comprises both inner and outer components, as shown in FIGS. 3a and 3b, respectively. When attached to an M45 mask, FIG. 1, the OVA fits with an Outlet Valve Body (OVB), which OVB has a microphone communication port, a drink tube, an outlet valve cover tab, but no means of attaching a JSMLT to the M45 mask. However, it is to be understood that the invention is not limited to this embodiment and may be used to form adaptors for other styles, types and countries of manufacture for protective masks in general.

The present invention provides the JSMLT with an apparatus, preferably portable, that can be easily applied to the JSMLT and act as an interface (adapter) for testing the M45 mask. This will fulfill the need in the field to test and validate M45 Outlet Valves, as well as other types of masks.

BRIEF DESCRIPTION OF THE DRAWINGS

The invention will now be explained and objects, other than those set forth above, will become apparent when consideration is given to the following detailed description which makes reference to the annexed drawings herein.

FIG. 1 is a front view of the M45 mask and the inner and outer components of the M45 Outer Valve Adapter (OVA);

FIG. 2 illustrates the components of the outlet valve body (OVB);

FIGS. 3(a) and 3(b) represent the inner and outer components, respectively, of the OVA;

FIGS. 9(a), 9(b), and 9(c) represent the sectional elevation, right side and top views, respectively, of the innermost component of the OVA;

FIGS. 10(a), 10(b), and 10(c), respectively, represent the right side, elevation sectional, and top views of the covering component surrounding the innermost component of the OVA shown in FIGS. 9(a)-9(c)

DESCRIPTION OF THE PREFERRED EMBODIMENTS

Figure 4:
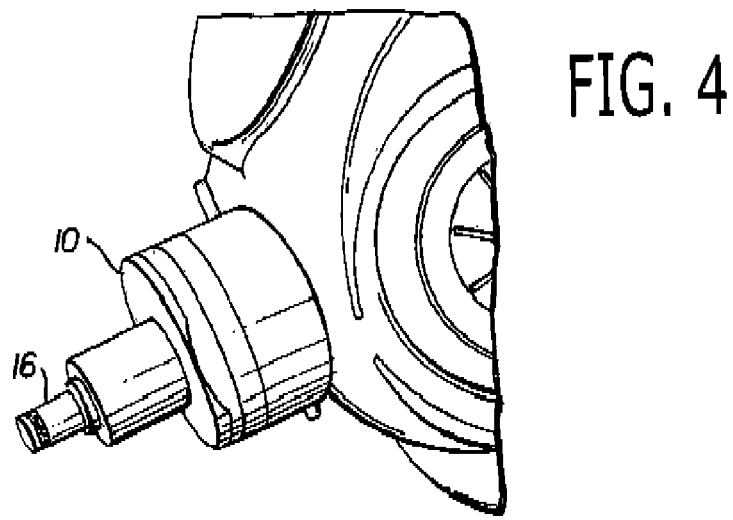
FIG. 4 illustrates the inner component of the OVA attached to an M45 mask.
Figure 5:
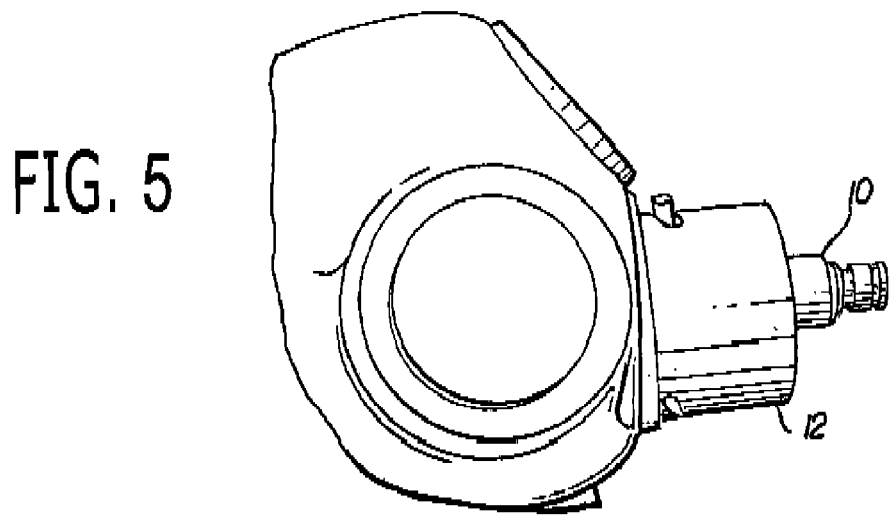
FIG. 5 illustrates the outer component of the OVA attached to an M45 mask.
Figure 6:
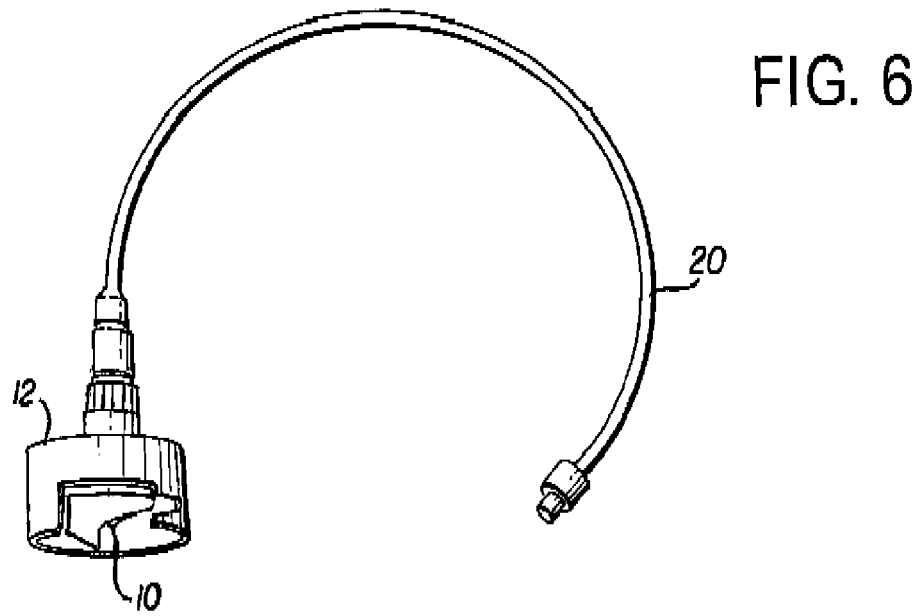
FIG. 6 depicts the JSMLT M45 adapter along with pressure tube and a threaded disk that comes with the JSMLT.
Figure 8:
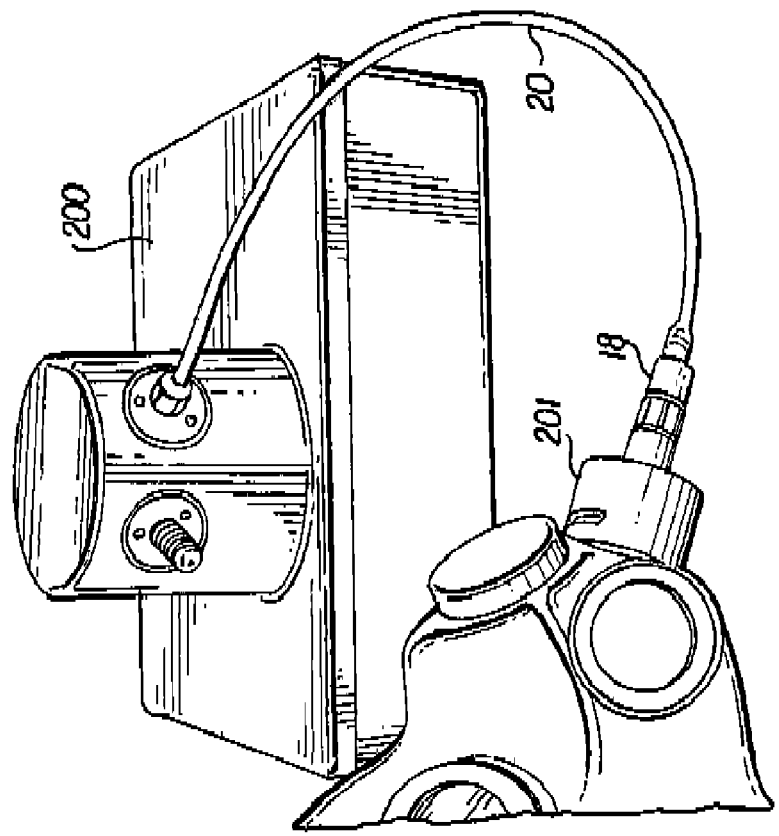
FIG. 8 represents the JSMLT M45 inner and outer component of the OVA testing a mask on the JSMLT.
Figure 7:
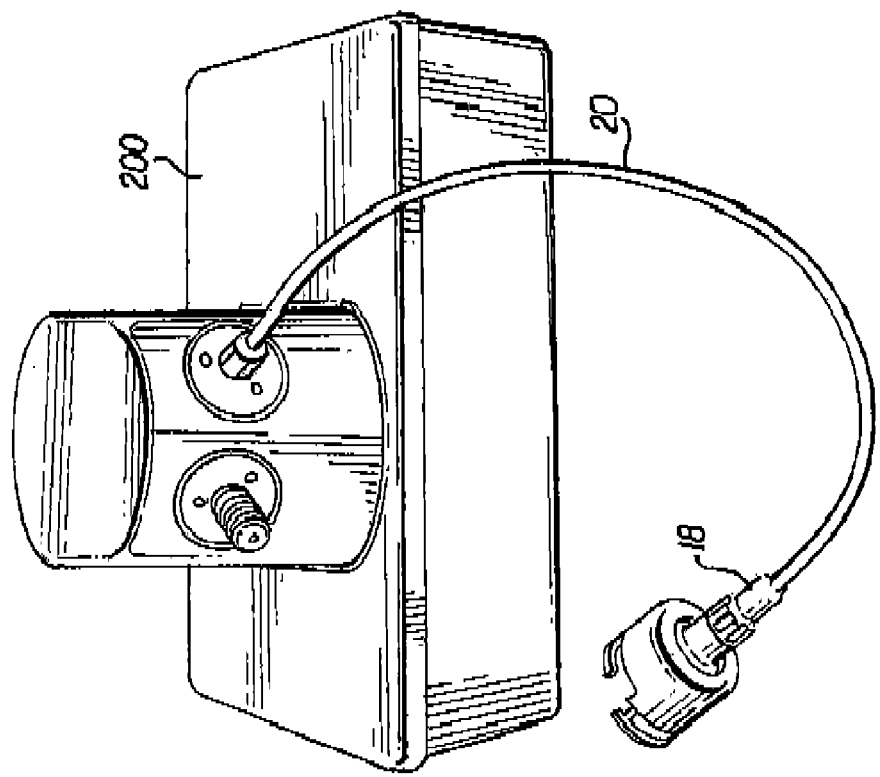
FIG. 7 illustrates the JSMLT M45 inner and outer component of the OVA attached to the JSMLT using the pressure tube.
Figure 11A:
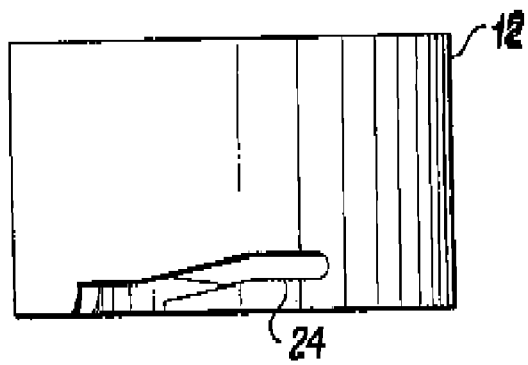
FIGS. 11(a), 11(b) and 11(c), respectively, represent the right side, top view, and left side of the outermost component of the OVA.
Figure 11B:
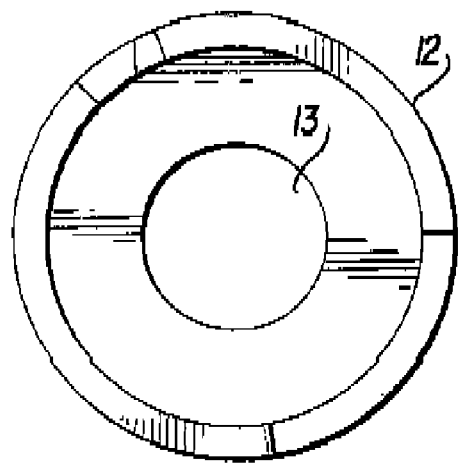
Figure 11C:
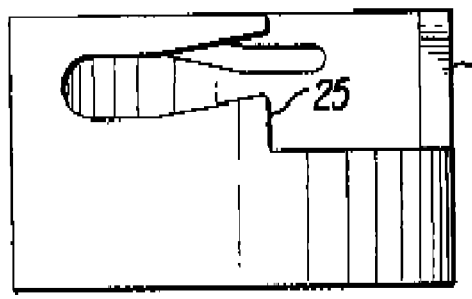

In order to test the serviceability of the protective masks, especially the outlet valve (OV) 34 of a JSM M45 mask 100, there arose a need to create an adapter to attach the JSMLT 200 to the mask 100. However, neither the OV 34 of the M45 mask 100 or its surrounding outer body provides a means for attaching the JSMLT 200 to the mask.

The inventors have, therefore, developed a two part outlet valve adapter (OVA) 201 comprising both inner component 10 and outer component 12. The inner component 10 has a rubbery elastomeric sealing surface 11 that, in use, lines up with an edge of the M45 outlet valve body (OVB) 14. The inner component 10 preferably comprises an injection molded part having an inner core of a polymer, preferably an olefin polymer, such as polyethylene and an outer covering of a polymer, such as a thermoplastic elastomer, preferably that sold under the trademark, SANTOPRENE®, available from Santoprene, Inc., a limited partnership of Exxon-Mobil. SANTOPRENE® having a durometer of 30 is particularly preferred.

To make the inner component 10, the olefin polymer, such as polyethylene is first molded and then used as a core for making the covering of SANTOPRENE®. The mold for shaping the SANTOPRENE® is larger than the core, permitting the SANTOPRENE® to encapsulate the core when the SANTOPRENE® fills the over mold cavity. Over molded material having a durometer from 25 to 40 are suitable materials satisfying such durometer values and include aluminum, stainless steel or polymers, such as polyethylene or polycarbonate.

The inner component 10 of the OVA 201 provides vital support for the adapter as well as providing the interference fit designed to fit the range of OVB diameters. The inner component 10 also includes the conduit 16 which is used to connect the quick disconnect fitting 18 of pressure tube 20.

The outer component 12 can also be injection molded from a polymer, such as an olefin, preferably polypropylene. This component 12 has sections cut away or formed as apertures 24 and 25, preferably with slotted, cammed surfaces that will engage projections, such as the drink tube 26 and outlet valve cover tab 28 of outlet valve body 14 on the joint service M45 mask 100. When outer component 12 is rotated relative to outlet valve body 14, thereby engaging the cammed surfaces against protrusions on the mask, these apertures 24 and 25 lock the outer component 12 to outlet valve body 14 while simultaneously exerting on inner component 10 to create an interference fit or seal. These apertures also act as a locking mechanism to retain outer component 12 in engagement with outlet valve body 14 and maintain the pressure on inner component 10 to maintain the seal by a downward force on inner component 10. The hole 13 through the center of outer component 12 provides a location for the pressure port 16 to sit without any interference. Pressure port 16 will attach to quick disconnect fitting 18 of pressure tube 20 leading to the Joint Service Mask Leakage Tester (JSMLT) 200.

The invention, thus, provides the adapter needed to connect existing JSMLT 200 to the OV body 14 of an M45 mask 100 to test the function and serviceability of the outlet valve 34 of the M45 mask 100.

It will be readily understood by those skilled in the art that the disclosed embodiments are given by way of example only and not by way of limitation. Thus, one could readily substitute other materials for production of the components of the adapter. For example, although we exemplified molded polymer materials, various metals, such as aluminum, stainless steel or other polymers, such as polyamide, polycarbonate, or other elastomers or engineering polymers can be used in production of the OVA, without departing from the scope of the invention.

Further, although we exemplified injection molding, other forms of shaping such as casting, extrusion, transfer molding and other molding processes or machining can be used to form the components of the OVA.

Additionally, although it is most desirable to design and shape the pans such that only the inner component 10 and outer component 12 are necessary to form the interference fit and seal required of the invention, it is also possible to use shims or spacers between these components to create the dimensions necessary to form the correct downward pressure to create the interference fit and seal.

Having fully described our invention, it will be apparent to those skilled in the art that various modifications can be made without departing from the spirit and scope of the appended claims.

We claim:

1. An adapter for connecting a protective mask to a leak testing device, said mask including outlet valve, said adapter comprising:
   an inner portion, said inner portion comprising a body defining at least one conduit therethrough for air communication of said leak testing device and said outlet valve, said inner portion further comprising a sealing surface; and, an outer portion, said outer portion adapted to surround said inner portion and having apertures therein for coupling to a portion of said mask, wherein said outer portion couples to the mask causing the sealing surface on inner portion to create a hermetic seal with the mask and wherein the outer portion couples to both the drink tube and an outlet valve cover tab of said mask.

2. The adapter of claim 1, wherein ad inner portion is comprised of at least two parts, an innermost part comprising a polymeric olefin, and an outer part comprising a polymeric elastomer.

3. The adapter of claim 2, wherein the outer part comprises a thermoplastic elastomer.

4. The adapter of claim 1, wherein said outer portion comprises a material having a durometer of about 25 to about 40.

5. The adapter of claim 1, wherein said outer portion comprises at least one material selected from the group consisting of aluminum, stainless steel, polyethylene, and polycarbonate.

6. The adapter of claim 1, wherein said conduit is shaped and sized to receive a quick disconnect fitting of a pressure tube.

7. The adapter of claim 1, wherein said sealing surface comprises a rubbery elastomeric polymer.

8. The adapter of claim 1, further including a mask leakage tester and a pressure hose coupling said adapter and said mask leakage tester.

9. The adapter of claim 8, wherein the pressure hose has a quick disconnect coupling to couple the pressure hose to the conduit.

10. The adapter of claim 8, further including a protective mask coupled to the adapter.

11. A method of testing an outlet valve of a protective mask, said method comprising:
    providing an adapter comprising an inner portion, said inner portion comprising a body defining at least one conduit therethrough for air communication between a leak testing device and said outlet valve, said inner portion further comprising a sealing surface; and, an outer portion, said outer portion adapted to surround said inner portion and having apertures therein for coupling to a portion of said mask;
    attaching said adapter to the protective mask, wherein the protective mask is an M45 mask and wherein said attaching is achieved by:
    inserting the inner portion of the adapter into an outlet valve body of the M45 protective mask,
    inserting the outer portion over both the drink tube and outlet valve cover tab, relatively rotating the outer portion and said both the drink tube and outlet valve cover tab to engage said on said outer portion and exert a force effecting a seal between said inner portion and said mask; and
    pressure testing the outlet valve.

12. The method of claim 11, further comprising providing a leak testing device and coupling the leak testing device to the adapter by connecting a pressure tube between the conduit of the adapter and the leak testing device.

13. The method of claim 12, wherein the leak testing device is a joint service mask leakage tester (JSMLT).

14. The method of claim 11, wherein said apertures comprise cammed surfaces to compress said sealing surface and form a hermetic seal with said mask.

15. The method of claim 14, wherein said cammed surfaces are formed on elongated slots.

* * * * *